United States Patent
Laukkanen et al.

(10) Patent No.: US 10,640,632 B2
(45) Date of Patent: May 5, 2020

(54) BIMODAL CELLULOSE COMPOSITION

(71) Applicant: Betulium Oy, Espoo (FI)

(72) Inventors: Antti Laukkanen, Helsinki (FI); Jason Mckee, Helsinki (FI)

(73) Assignee: BETULIUM OY, Espoo (FI)

( * ) Notice: Subject to any disclaimer, the term of this patent is extended or adjusted under 35 U.S.C. 154(b) by 0 days.

(21) Appl. No.: 16/062,418

(22) PCT Filed: Dec. 14, 2016

(86) PCT No.: PCT/FI2016/050869
§ 371 (c)(1),
(2) Date: Jun. 14, 2018

(87) PCT Pub. No.: WO2017/103328
PCT Pub. Date: Jun. 22, 2017

(65) Prior Publication Data
US 2018/0371211 A1      Dec. 27, 2018

(30) Foreign Application Priority Data
Dec. 15, 2015   (FI) ..................... 20155950

(51) Int. Cl.
| | | |
|---|---|---|
| *C08L 1/02* | (2006.01) | |
| *C08L 97/00* | (2006.01) | |
| *D21H 11/18* | (2006.01) | |
| *C08L 89/00* | (2006.01) | |
| *C08L 97/02* | (2006.01) | |
| *B82Y 30/00* | (2011.01) | |
| *C08L 5/14* | (2006.01) | |

(52) U.S. Cl.
CPC ............... *C08L 1/02* (2013.01); *C08L 97/005* (2013.01); *D21H 11/18* (2013.01); *B82Y 30/00* (2013.01); *C08L 5/14* (2013.01); *C08L 89/00* (2013.01); *C08L 97/02* (2013.01)

(58) Field of Classification Search
CPC .......... C08L 1/02; C08L 89/00; C08L 97/005; D21H 11/18
See application file for complete search history.

(56) References Cited

U.S. PATENT DOCUMENTS

| | | |
|---|---|---|
| 5,964,983 A | 10/1999 | Dinand et al. |
| 2004/0086626 A1 | 5/2004 | Lundberg et al. |

(Continued)

FOREIGN PATENT DOCUMENTS

| | | |
|---|---|---|
| CN | 102505546 A | 6/2012 |
| CN | 103422379 A | 12/2013 |

(Continued)

OTHER PUBLICATIONS

Dinand et al., "Parenchymal cell cellulose from sugar beet pulp: preparation and properties" Cellulose 3, 1996, 4 pages.

(Continued)

*Primary Examiner* — Robert D Harlan
(74) *Attorney, Agent, or Firm* — Ziegler IP Law Group, LLC

(57) ABSTRACT

A method of producing from cellulose pith a composition having bimodal distribution of its components. The composition can be used to modify rheological properties of compositions of matter and for making articles of manufacture and nanocomposites.

15 Claims, 4 Drawing Sheets

(56) References Cited

U.S. PATENT DOCUMENTS

Figure 1:
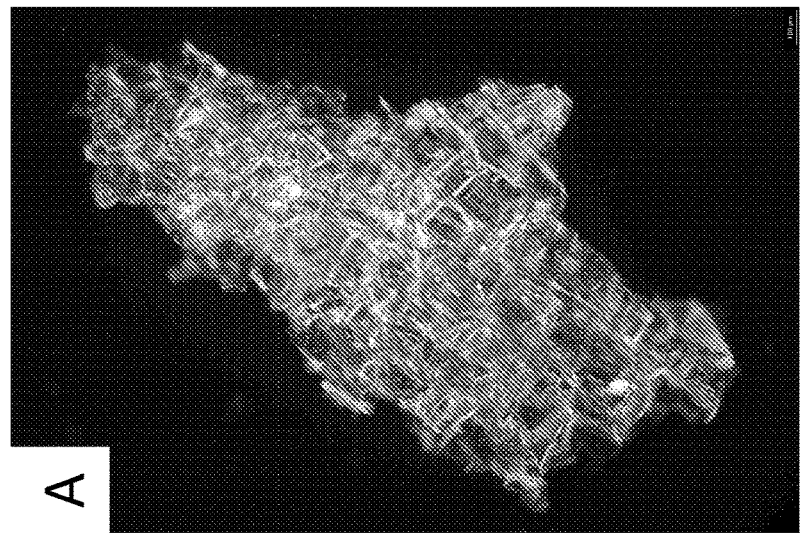
Figure 1:
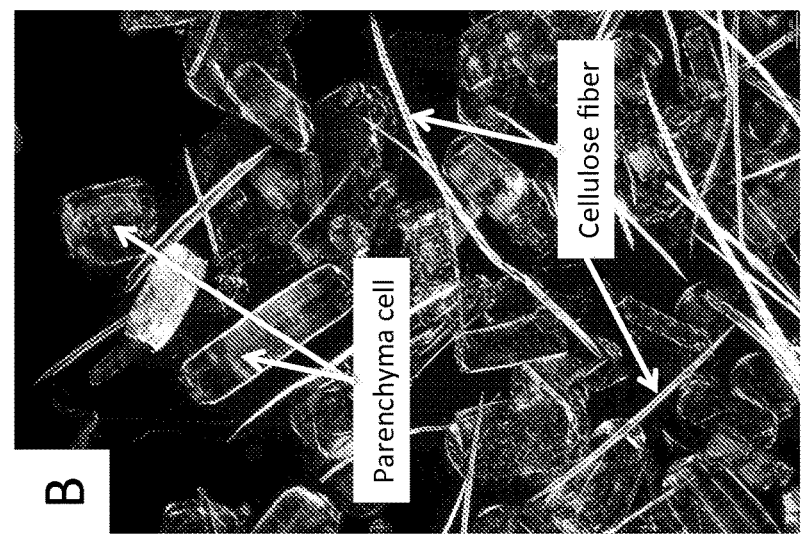
Figure 1:
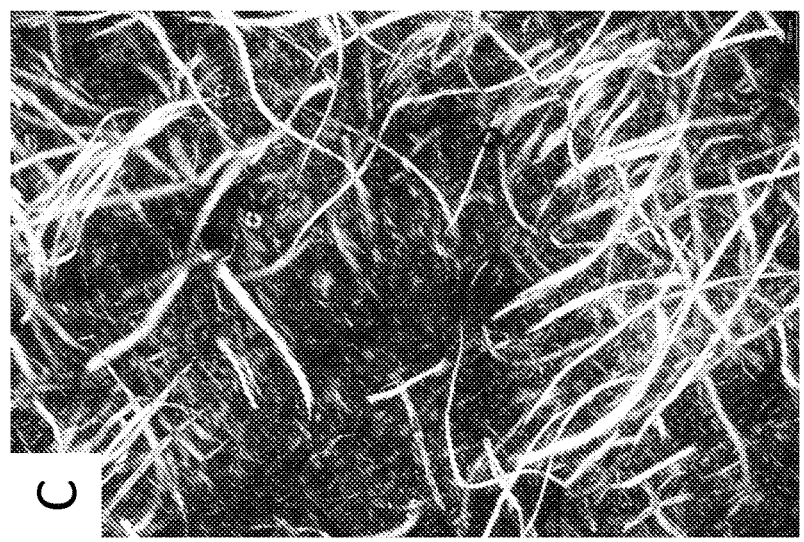

2008/0227753 A1* 9/2008 Lian .................. A61K 8/027
514/57
2015/0210967 A1 7/2015 Van Engelen et al.

FOREIGN PATENT DOCUMENTS

| GB | 1221226 A | 2/1971 | | |
|---|---|---|---|---|
| WO | WO-2016075370 A1 * | 5/2016 | ............. | A61K 8/731 |
| WO | WO-2016075371 A1 * | 5/2016 | ............. | C08B 15/02 |
| WO | WO-2017103329 A1 * | 6/2017 | ............... | D21C 3/02 |

OTHER PUBLICATIONS

Alcalá et al. "All-cellulose composites from unbleached hardwood kraft pulp reinforced with nanofibrillated cellulose" Cellulose 20, 2013, 13 pages.
Finnish Patent and Registration Office, Search Report, Application No. 20155950, dated Jul. 6, 2016, 2 pages.
International Search Report, Application No. PCT/FI2016/050869, dated Feb. 16, 2017, 5 pages.
Finnish Patent and Registration Office, Office Action, Application No. 20155950, dated Jul. 6, 2016.
Written Opinion of the International Searching Authority, Application No. PCT/FI2016/050869, dated Feb. 16, 2017, 6 pages.

* cited by examiner

BIMODAL CELLULOSE COMPOSITION

FIELD

The present description is related to the field of parenchymal cellulose based materials. More particularly, it provides a novel nanocellulose composition from a non-wood source such as bagasse or bagasse pith, as well as its uses and methods of manufacture.

BACKGROUND

Cellulose is a substance of great industrial importance having numerous applications. Primary source of cellulose in industrial applications is wood-based cellulose pulp. However, in using wood-based raw-material there are several problems such as environmental issues relating to unsustainable use of land and soil and heavy energy consumption required to grow, harvest and process wood-based material. These issues have created a need to find, on one hand, alternative sources of cellulose for producing new cellulosic materials. Further, the industry is constantly searching for more economical methods and raw materials to produce high quality cellulosic products.

In nature, native cellulose is always in a microfibrillar form, being part of wall structures of the plant cell. In primary cell walls, especially in parenchyma cells, cellulose microfibrils are distributed randomly forming a flexible membrane layer together with other polysaccharides, such as pectin and hemicelluloses. In certain plant species, an additional secondary wall structure is formed after the cell is fully-grown, especially in various wood species. In the secondary cell walls, the microfibrils are highly aligned mostly in the same direction and tightly bound to each other through hydrogen-bonding and covalent lignin bridges, forming a very rigid structure.

Cellulose microfibrils located either in primary or secondary walls are structurally very similar, if not identical (Thomas et al., Structure of Cellulose Microfibrils in Primary Cell Walls). Both type of microfibrils consist of highly aligned cellulose macromolecule chains forming mechanically strong cellulose crystals with hydrogen bonded parallel polymer chains. The microfibrils are generally considered to contain only few faults along their axis, although the degree of crystallinity varies between plant species being generally higher for microfibrils obtained from secondary walls. It is commonly understood that, depending on the plant specie, 18, 24, or 36 cellulose chains form the smallest aligned structure, which is known as cellulose elementary fibril having diameter of a few nanometers and lengths up to tens of micrometers. These nanofibers have remarkable mechanical properties: tensile strength in the order of 138 GPa and toughness in the order of 13 GPa. Thus, cellulosic microfibrils are of interest if they can be dissociated into single fibres.

Although the secondary cell walls, for example in wood, are rich of cellulose microfibrils, isolation of the structures without damaging the fibrils itself is very difficult. Also, the needed fibrillation process is complicated, expensive, and often a chemical pre-treatment is needed prior to fibrillation. Plant tissues made of primary cell walls, however, form an alternative source for the separation of the microfibrils. Cells with primary walls are common for example in all fruit and vegetable species. These plants are mainly composed of parenchyma cells, i.e. ground tissue that generally constitutes the "filler" tissue in soft parts of plants. They have thin but flexible primary cell walls and the secondary cell wall is usually absent. The parenchyma tissue has a variety of functions, for example, to store starch in tubers, such as potato and cassava or storage of sucrose in sugar beet and sugar cane pith. In addition to the loose deposition of the microfibrils in the primary walls, the other polysaccharides present in the cell wall have a more charged nature, which allows for more facile processing to separate the individual microfibrils.

In certain plant species, primary and secondary cell wall structures co-exist. For example, in various grasses the plant structure is composed of rigid outer shell made of macroscopic cellulose fibers with a thick secondary cell wall and a soft internal core, a pith tissue, made of predominantly parenchyma cells with a thin primary wall. The core part often contains also a small fraction of cellulose fibers. As was described, the cellulose microfibrils in primary walls are easier to separate than the fibrils in secondary wall structures.

Sugar cane is an economically important plant with an estimated worldwide harvest of 1.83 billion tonnes. Sugar cane is 3 to 6 metres tall and consists of stout jointed stalks, rich in sucrose. Mature stalks consist of 11-16% fibre, 12-16% soluble sugars and 63-73% water. The stalks themselves consist of a hard outer shell called dermal tissue which functions to water proof the inner core and to strengthen the stalk, allowing it to grow tall. The soft inner core consists of the ground tissue that has filled around the vasculine tissue. More specifically, the ground vasculine tissue consists mainly of parenchyma cells.

Sugar canes are typically processed by mechanically crushing the stalks to remove the sugar rich juice. Thereafter, the spent fibrous matter, called bagasse, can be used in the production of biofuel or to manufacture pulp for paper and board products or building materials. Especially for the paper and pulp industries the bagasse is stored wet in order to assist in the removal of the short pith fibres and the soft parenchymal cells, i.e. the softer inner core, which impede the paper and board making process. Various mechanical processes have been developed to assist depithing, including hammer milling and dry fractioning. The resulting fraction is called bagasse pith or spent bagasse pith.

Spent bagasse pith comprises predominantly pectin, arabinogalactan and cellulose. Other naturally occurring biological constituents of bagasse pith, such as fats proteins, soluble oligosaccharides, and other low molecular weight components, are largely extracted from sugar cane during the removal of sucrose therefrom. The remaining polysaccharides in bagasse pith generally conjugated, particulate cell residuals having morphologies generally characteristic of parenchymal cells found in certain higher plants. Often, the bagasse pith also contains a small number of cellulose fibres even after depithing process: although the pith tissue is predominantly composed of parenchyma cells a small number of cellulose fibers are present to stabilize the soft tissue in the original plant structure. Few economical uses have been found for bagasse pith. For example bagasse pith is a material that spoils rapidly and consequently constitutes a local environmental problem. Thus, alternative uses for these waste streams are needed.

The following patents represent the current state of the art of processing bagasse. Thus far bagasse based products have been manufactured by fibrillating the cellulosic component from bagasse extracted from the secondary wall structures and/or the extracted using ionic liquids.

CN 103422379 discloses a method for preparation of dried cellulose fibres from bagasse. The method comprises treating by acid and base, followed by mechanical grinding to obtain uniform biomass.

CN 102505546 discloses a method for preparation of homogeneous cellulose nanofibres from sugar cane, wherein the cellulose fibres are extracted in ionic liquids followed by high-pressure fibrillation. The resulting product is mainly based on secondary wall structures, not parenchymal cellulose.

US 20080227753 A1 discloses a method for preparation of sugar cane bagasse fibers by pulverising a frozen and dried bagasse for use as a dietary supplement.

Even though some uses for cellulose rich food/feed waste streams are envisaged, due to logistical requirements it would be beneficial to be able to process the raw material locally without need for transportation.

Further, it would be advantageous to be able to process high volume raw materials into high quality products.

It is an aim to solve or alleviate at least some of the problems related to prior cellulosic materials and their production methods, as discussed above. In particular, an aim is to provide from a novel raw material source for manufacturing cellulosic materials that have good rheological and/or binder properties in aqueous suspensions and good mechanical and/or binder properties in a dry state.

Another aim is to provide a new use for the spent bagasse pith.

Another aim is to provide additive compositions for industrial applications, paper and board manufacture in particular.

Another aim is to provide new high performance articles of manufacture.

SUMMARY

In this present disclosure, we describe a novel method to specifically separate the cellulose microfibrils from the primary wall structures while maintaining cellulose fibers in native state yielding a novel mixture of nanofibrillar parenchymal cellulose and cellulose fibers.

According to the first aspect there is provided a composition comprising:
A nanofibrillar parenchymal cellulose; and
B cellulose fibers;
wherein both A and B are obtained from cellulose pith.

Central to the aspects of the disclosed embodiments is the finding that the cellulose pith, which is formed from a mixture of parenchymal cells and cellulose fibers can be processed into a composition having bimodal distribution of cellulosic fibrous particles objects, comprising nanofibrillated parenchymal cellulose fibrils from parenchymal cells and non-fibrillated cellulose fibers. This mixture allows for a natural nanocomposite structure, which leads to different mechanical and rheological properties when compared to its analogous pure parenchymal nanocellulosic materials, extracted from, for example, potato or sugar beet or nanocellulosic materials extracted from the secondary cell walls.

The present cellulose pith-based composition has several advantageous properties compared to purely parenchymal-based nanofibrillar cellulose. As the aspects of the disclosed embodiments contain a bimodal mixture of both nanofibrillar parenchymal cellulose and cellulose fibers, the resulting rheological and mechanical properties differ from their pure nanocellulosic counterparts, making them especially suitable for certain applications, such as: paper and board, cosmetics, food and feed, oil drilling, paints and adhesives, agricultural and composite industries. More specifically, applications wherein the bimodal fibril distribution has no adverse effect on the product properties are most suitable, for example paper and board strengthening agents, food and feed binders, rheology modifiers or oil drilling.

According to a second aspect there is provided a use of, or a method of using, the composition according to the first aspect for modifying rheological properties of a composition of matter. The composition according to the first aspect can be incorporated or included into said composition of matter.

According to a third aspect there is provided a use of, or a method of using, the composition according to the first aspect for improving at least one of sizing, strength, scale control, drainage, dewatering, retention, clarification, formation, adsorbency, film formation, membrane formation, and polyelectrolyte complexation during paper or board manufacture.

According to a fourth aspect there is provided a use of the composition according to the first aspect for improving stability of an emulsion, suspension, dispersion, or foam system.

According to a fifth aspect there is provided an article of manufacture comprising, or formed of, the composition according to the first aspect.

The article is recyclable, easy to manufacture and obtainable from a low cost raw material. Further, its mechanical properties can be adjusted e.g. by changing the NB ratio or degree of fibrillation.

According to a sixth aspect there is provided a method of making an article of manufacture comprising a step of using the composition according to the first aspect. The article can be manufactured using methods similar as known by persons skilled in making articles of manufacture from cellulosic materials such as microcellulose or nanocellulose.

According to the seventh aspect there is provided a process for preparing a composition, the process comprising:
a. providing or isolating cellulose pith from cellulose pith material
b. treating the cellulose pith with an alkali
c. fibrillating the alkali treated cellulose pith.

The steps may be carried out in the following sequence: a., b., and c.

The composition may be the composition of the first aspect.

In step b. water can be added to provide a suspension having a desired water content.

The relative fraction of cellulose fibers to parenchymal cellulose can be altered after step a or b by fractionating the composition.

The relative fraction of cellulose fibers to nanofibrillar cellulose can be altered after step c by fractionating the composition.

An advantage of the process is that it can easily be implemented at the site where bagasse or any cellulose pith is produced. Also, the composition after the step b can be easily concentrated by filtration techniques and the fibrillation step c can be conducted in different location.

The present composition and its production method have several advantages compared to pure wood-based cellulose and wood-based derivative materials. The present invention is able to utilize non-wood raw material from problematic agricultural waste streams to produce cellulosic materials having improved rheological properties, thereby solving problems related to use of wood-based raw materials. Further, consumption of energy and chemicals in the manufacture of nanocellulosic products can be reduced.

The present composition is capable of forming a gel in water throughout the concentration range of between about 0.1% and about 100%, such as throughout the concentration range of between about 0.5% and about 50%, or at 0.1%, 0.2%, 0.3%, 0.4%, 0.5%, 0.6%, 0.7%, 0.8%, 0.9%, 1%, 1.5%, 2%, 2.5%, 3%, 3.5%, 4%, 4.5%, 5%, 5.5%, 6%, 6.5%, 7% 7.5%, 8%, 8.5%, 9%, 9.5%, 10%, 15%, 20%, 25%, 30%, 35%, 40%, 45%, 46%, 47%, 48%, 49%, 50%, 51%, 52%, 53%, 54%, 55%, 60%, 65%, 70%, 75%, 80%, 85%, 90%, 91%, 92%, 93%, 94%, 95%, 96%, 97%, 98%, 99%, or 100% in water. The percentage is w/v (weight of dry composition).

According to an eighth aspect is provided use of the composition according to the first aspect for manufacturing a nanocomposite.

According to another aspect there is provided a composition comprising nanofibrillar parenchymal cellulose obtained from bagasse and manufactured by removing the cellulose fibers and fibrillating the parenchymal cellulose extracted from bagasse pith to allow for pure parenchymal nanocellulose.

According to another aspect there is provided a method of modifying rheological properties of a composition of matter, said method comprising the step of incorporating into said composition of matter the present fibrillated parenchymal cellulose, or the composition.

The present nanofibrillar parenchymal cellulose, or the composition, is able to modify rheological properties of a composition of matter when incorporated or mixed into it. Accordingly, they may be used to modify and improve one or more of the properties selected from viscosity, suspension stability, gel insensitivity to temperature, shear reversible gelation, yield stress, and liquid retention of the composition of matter. Compositions whose rheological properties may be modified in this manner include foods, feeds, pharmaceuticals, nutraceuticals, personal care products, fibers, papers, paints, coatings, and construction compositions. More specifically, suitable compositions include oral care products; creams or lotions for epidermal application, including moisturizing, night, anti-age, or sunscreen creams or lotions; food spreads, including reduced fat, low fat, or fat free food spreads (for example, mayonnaise); and drilling fluids.

According to another aspect there is provided a method of improving at least one of sizing, strength, scale control, drainage, dewatering, retention, clarification, formation, film formation, membrane formation during paper manufacture, said method comprising the step of using the present composition According to another aspect there is provided a method for improving the stability of an emulsion, dispersion, or foam system, said method comprising the step of including in the system the present the present composition.

According to another aspect there is provided cellulose gel obtained by providing the composition produced according to the process of seventh aspect in water.

Different embodiments of the present invention will be illustrated or have been illustrated only in connection with some aspects of the invention. A person skilled in the art appreciates that any embodiment of an aspect of the invention may apply to the same aspect of the invention or to other aspects of the disclosed embodiments.

DETAILED DESCRIPTION

FIG. 1. Optical microscopy images of parenchymal material from bagasse pith. A: hydrated raw material without any treatments, obtained according to Example 0, B: base extracted (0.76 M NaOH) bagasse after mixing with Waring blender, note the parenchyma cells and cellulose fibres; C: the sample B after homogenization (4 pass at 600 bar), note that only the cellulose fibres are visible as the parenchymal nanocellulose can not be visualized using optical microscopy. Scale bar 100 micrometers, magnification 10× with polarizers.

Figure 2:
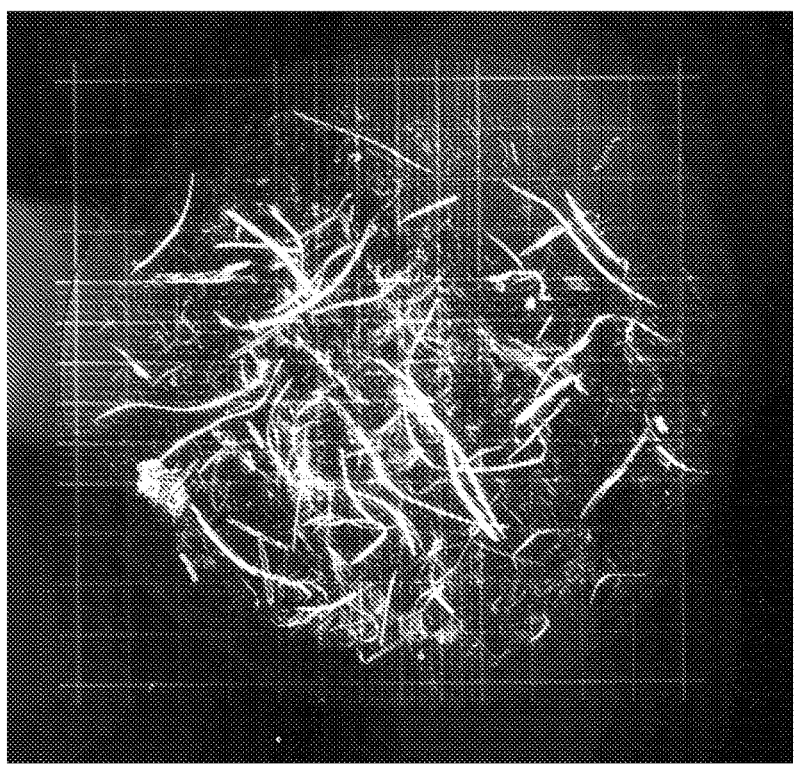

FIG. 2. Optical microscopy image of fibrillated sample (Sample 121-4 pass at 0.05 wt. %), 10 mg deposited onto a standard sized counting grid (3×3 mm). Note that only the cellulose fibres are visible as the parenchymal nanocellulose cannot be visualized using optical microscopy. Magnification 10× with polarizers.

Figure 3:
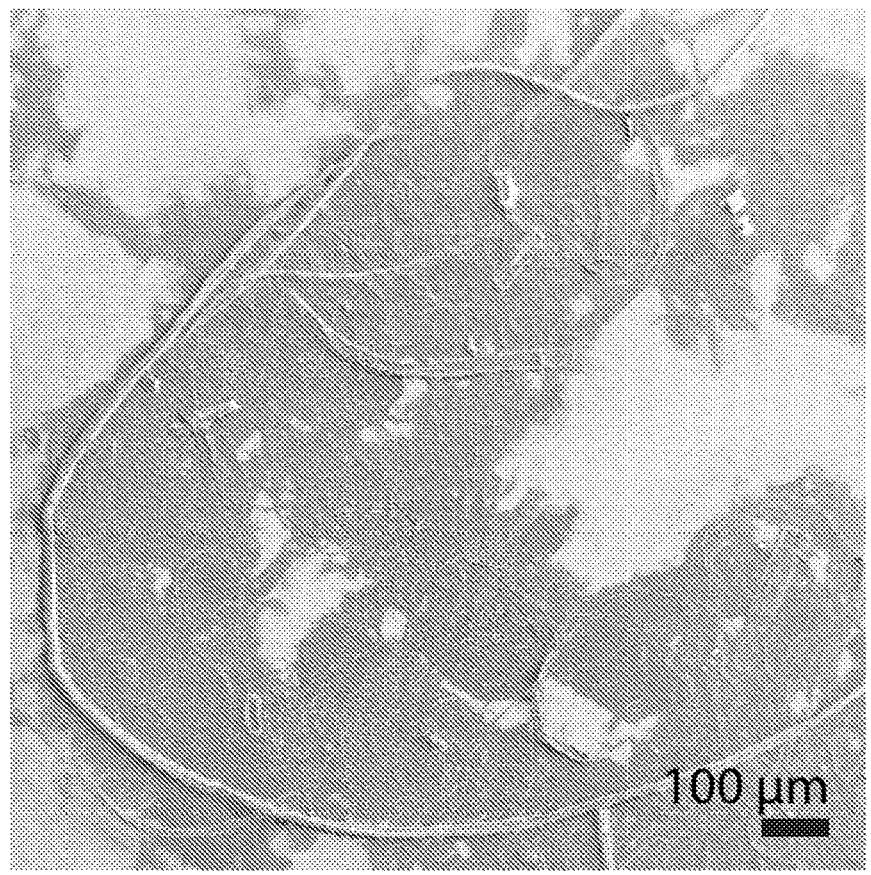

FIG. 3. Scanning electron microscopy image of Sample 121-4pass. Note the bimodal composition. Scale bar 100 microns.

Figure 4:
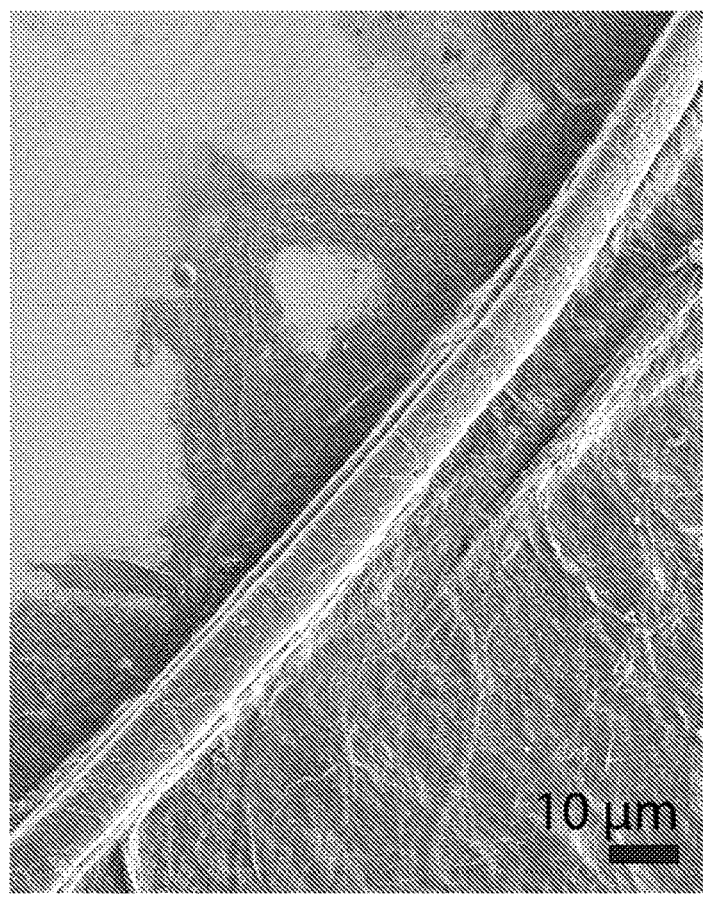

FIG. 4. Scanning electron microscopy image of Sample 121-4pass. Note the bimodal composition. Scale bar 10 microns.

Figure 5:
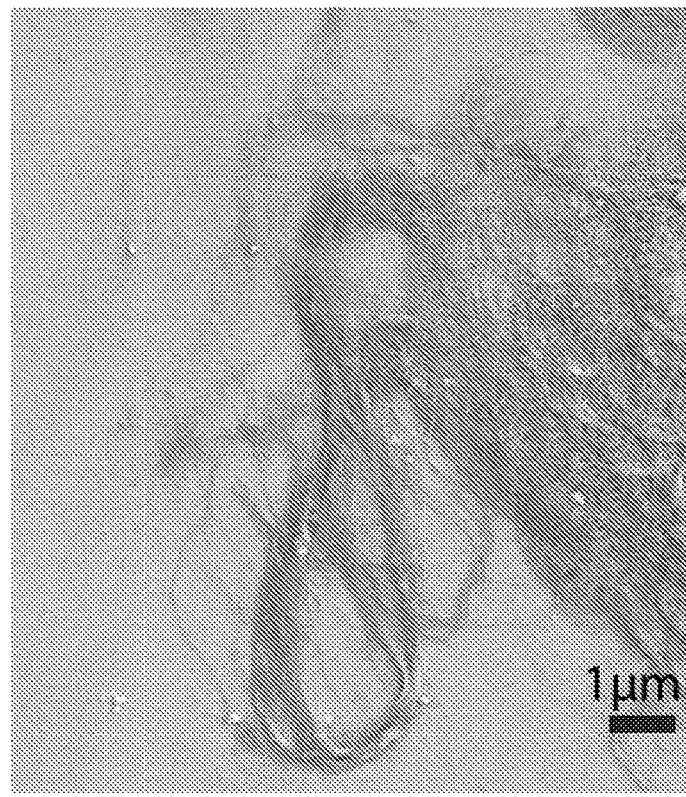

FIG. 5. Scanning electron microscopy image of Sample 121-4pass. Note the nanofibrillar composition. Scale bar 1 micron.

Figure 6:
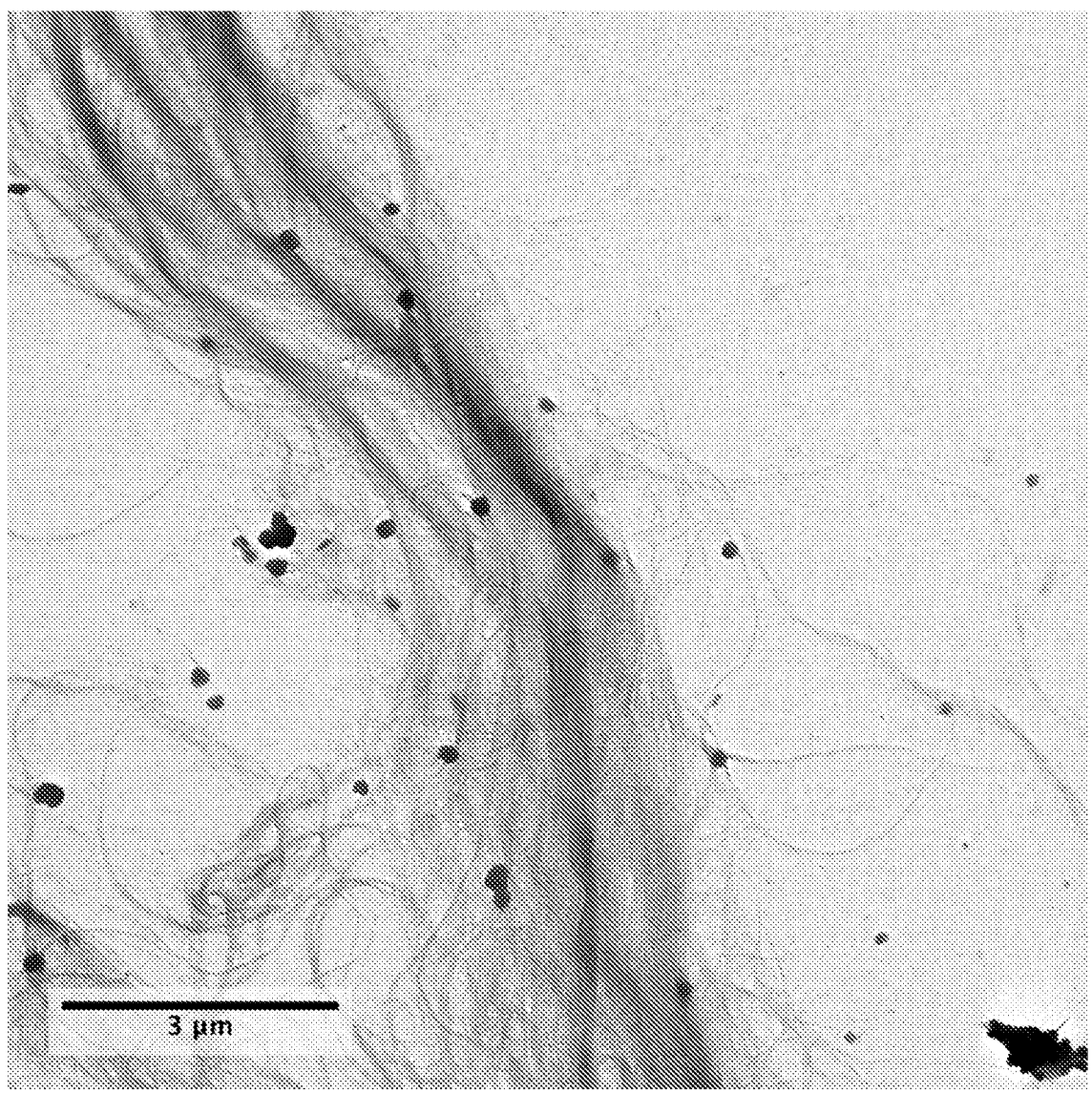

FIG. 6. Transmission electron microscopy image of Sample 121-4 pass. Note the nanofibrillar composition. Scale bar 3 microns.

The raw material, which can be used to produce the present composition or which is used in the present processes may be obtained from a suitable cellulose pith material, especially the pith part of bagasse, spent bagasse pith, or from pith rich fraction of bagasse.

The term "parenchymal cellulose" is used to describe plant-based cellulose rich material composed of predominantly primary cell wall structures, i.e. parenchyma cells.

The term "cellulose fiber" is used to describe plant-based cellulose rich material composed predominantly of macroscopic cellulose fibers with a thick secondary cell wall structure, such as fibers in an outer shell of a sugar cane or corn stalk. Typically the diameter of a cellulose fiber is between 5-40 micrometers and length above 200 micrometers, often several millimetres.

The "cellulose pith material" which is used to produce the novel composition according to the present invention, may be obtained from any suitable plant source, including plant species that contain pith. Examples of plants from where the cellulose pith can be easily isolated include sugar cane, bamboo, corn, various grass and straw structures e.g. wheat, barley, rye, oats, rice, sabai, albardine, esparto etc. Approximately 33-35% of the oven-dry weight of sugar cane bagasse is cellulose pith, while corn stalks have a cellulose pith content of approximately 21% (Atchison, J. E., "Data on Nonwood Plant Fibers," Chapter 2 in Pulp and Paper Manufacture, Vol. 3—Secondary Fibers and Nonwood Pulping, Joint Textbook Committee of the Paper Industry, 3rd Ed, 1987, Atlanta/Montreal). Especially well suitable raw materials are pre-fractionated cellulose pith side-streams from paper and board industries using non-wood fibers as the main fiber source. Parenchymal cellulose structures, i.e. pith fractions, are widely known to be poorly suitable for papermaking and the fraction is often removed from the outer shell cellulose fibers prior to paper making process.

Term "cellulose pith" is used to describe an isolated parenchymal cellulose rich fraction of plant material, obtained by separating majority of cellulose fibers from parenchymal cellulose. The cellulose pith comprises parenchymal cells and a minor amount of cellulose fibers.

"Nanofibrillar parenchymal cellulose" in this context means cellulose microfibrils or a cellulose microfibril bundles isolated from the above-mentioned cellulose pith. The aspect ratio of the microfibrils is typically very high; the length of the microfibrils may be more than one micrometer and the number-average diameter is typically less than 200 nm, such as between 2 and 100 nm. The diameter of microfibril bundles may be greater, but it is usually less than 1 μm. The smallest microfibrils are similar to the so-called elementary fibrils, the diameter of which is typically 2 to 12 nm. Nanofibrillar parenchymal cellulose may also contain other polysaccharides, such as pectin, the amount of which, for example, depends on the raw material used and the processing method. Nanofibrillar parenchymal cellulose can be isolated from the above-described cellulose pith with an apparatus suitable for the purpose, e.g. a grinder, comminutor, rotor-stator mixer or grinders such as Ultra-Turrax, Masuko from Masuko Sangyo, rotor-rotor mixers or grinders such as Atrex-type devices, homogenizer such as Ariete-type or Panda-type from GEA Niro-Soavi, fluidizer, micro- or macrofluidizer such as microfluidizer from Microfluidics and/or ultrasonic disintegrator.

Herein nanofibrillar parenchymal cellulose is understood to encompass native fibrils or fibril bundles and also any chemically or physically derivatized form. The chemical derivatisation may be based for example on carboxymethylation, oxidation, bleaching, acetylation, TEMPO-mediated oxidation, esterification, or etherification reaction of cellulose molecules. Modified fibrils can for example be anionically or cationically charged derivate containing anionically or cationically charged groups, respectively. Examples of anionically charged derivates include oxidized nanofibrillar cellulose and carboxymethylated nanofibrillar cellulose. In oxidized nanofibrillar cellulose at least some of the C6 primary hydroxyl groups of cellulose are selectively oxidized to carbonyl groups, i.e. aldehydes and/or carboxyl groups. Oxidized fibrils can be obtained for example catalytically by a heterocyclic nitroxyl compound mediated oxidation, for example by 2,2,6,6-tetramethylpiperidinyl-1-oxyl free radical (TEMPO)-mediated oxidation. Examples of cationically charged nanofibrillar cellulose include chemically modified cellulose that contains quaternary ammonium groups as a result of the modification. Derivatisation may also be realized by physical adsorption of anionic, cationic, or non-ionic substances or any combination of these on cellulose surface. The described derivatisation can be carried out before, after, or during the production of nanofibrillar cellulose. Derivatized grades are typically prepared from bleached cellulose pith. In the derivatized grades, any hemicelluloses present may also be derivatized together with the cellulose domain.

In an embodiment the cellulose pith is bagasse pith.

Preferably the parenchymal cellulose is obtained from purified, optionally bleached primary wall cellulose or cellulose pith.

In an embodiment the cellulose pith, which is used to produce the composition including nanofibrillar cellulose and cellulose fibers according to the present invention is fresh, never dried, or dried.

There are several widely used synonyms for these isolated microfibrils, for example: nanocellulose, microfibrillar cellulose, nanofibrillated cellulose, cellulose nanofiber, nano-scale fibrillated cellulose, microfibrillated cellulose (MFC), homogenized parenchymal cell cellulose, cellulose microfibrils, or fibrillated parenchymal cellulose.

Nanofibrillar parenchymal cellulose forms a continuous gel when dispersed in water, even at low concentration. A continuous gel in this context means a mixture of fibrillated parenchymal cellulose, cellulose fibers, and water, where the fibrillated parenchymal cellulose component does not settle out of the continuous phase at rest.

After fibrillation the parenchymal cellulose of the present invention has improved rheological properties and the resulting gel comprising the fibrillated cellulose in an aqueous medium has increased viscosity.

Degree of fibrillation can be also followed by measuring turbidity of dilute aqueous dispersions of fibrillated parenchymal cellulose. Upon fibrillation, the particle size gradually decreases and light scattering from the dispersed particles is decreased. Fully nano-sized cellulose fibrils are substantially transparent in an aqueous medium.

The term bimodal refers to the distribution of the cellulosic fibrous particles in the composition. In the context of the cellulosic composition of the present disclosure it refers to the presence of both nanofibrillar cellulose and cellulose fibers in the composition.

In an embodiment of the first aspect the relative weight ratio A/B is between 100/1 and 0.1/1, preferably between 10/1 and 1/1, most preferably between 3/1 and 2/1. In another embodiment the upper and lowed endpoints, or the A/B ratios, are selected from about 100/1, 90/1, 80/1, 70/1, 60/1, 50/1, 40/1, 30/1, 20/1, 10/1, 9/1, 8/1, 7/1, 6/1, 5/1, 4/1, 3/1, 2/1, 1/1, 0.9/1, 0.8/1, 0.7/1, 0.6/1, 0.5/1, 0.4/1, 0.3/1, 0.2/1 or 0.1/1.

In an embodiment of the first aspect the number of cellulose fibers is between 100 and 100.000, preferably between 1000 and 10.000, more preferably between 2.500 and 7.5000, most preferably between 5.000 and 5.500, in 1 ml of 0.05 wt % dispersion of components A and B in water.

In an embodiment the number of cellulose fibers is at most 100 000 in 1 ml of 0.05 wt-% dispersion of components A and B in water in 1 ml of 0.05 wt-% dispersion of components A and B in water.

In an embodiment the number of cellulose fibers is 100.000, 90.000, 80.000, 70.000, 60.000, 50.000, 40.000, 30.000, 20.000, 10.000, 9.000, 8.000, 7.000, 6.000, 5.000, 4.000, 3.000, 2.000, 1.000, 900, 800, 700, 600, 500, 400, 300, 200 or 100 in 1 ml of 0.05 wt-% dispersion of components A and B in water.

In an embodiment of the first aspect the composition has a property of forming from an aqueous dispersion a film having a tensile strength higher than 40 MPa.

In an embodiment of the first aspect the composition is capable of forming a continuous gel from an aqueous dispersion at at least one point in a concentration range of from about 0.1 wt. % to about 2 wt. % based on total weight of the gel.

In an embodiment of the first aspect the composition comprises nanofibrillar parenchymal cellulose preferably having a number average diameter of 2-200 nm, preferably of 10-100 nm, more preferably 20-70 nm, such as about 2, 3, 4, 5, 6, 7, 8, 9, 10, 20, 25, 30, 35, 40, 45, 50, 60, 70, 80, 90, 100, 110, 120, 130, 140, 150, 160, 170, 180, 190 or 200 nm.

In an embodiment the composition of the first aspect consists of A, B and optionally water.

In an embodiment the cellulose pith is fresh, never dried, or dried.

Preferably the nanofibrillar parenchymal cellulose is obtained from purified, optionally bleached parenchymal cellulose fraction of the cellulose pith.

In an embodiment of the seventh aspect the process comprises a fractionating step between steps a. and b., or between the steps b. and c., to recover a parenchymal cell rich fraction or to alter the relative fraction of parenchymal cells and cellulose fibers.

In another embodiment the fractionating step is by dry fractioning or wet fractioning. Suitable dry fractionating methods include mechanical depithing or hammering.

In an embodiment of the seventh aspect the process comprises a fractionating step after step c to recover the nanofibrillar parenchymal cell rich fraction or to alter the relative fraction of A and B fractions. In another embodiment the fractionating step is by dry fractioning or wet fractioning.

In an embodiment of the seventh aspect the alkali treatment in step b. comprises washing the alkali treated cellulose pith and removing the filtrate.

In an embodiment of the seventh aspect the alkali treated cellulose pith obtained in step b. is neutralised before fibrillation.

In an embodiment of the seventh aspect a chemical derivatization is carried before, after or during the step b, the chemical derivatization preferably including cationization, oxidation, bleaching, acetylation, esterification, etherification reactions, or a combination thereof.

In an example embodiment in the process for producing the present composition the fibrillation procedure is conducted using methods which selectively nanofibrillate only the parenchymal cellulose and not the cellulose fibers, leading to a bimodal fibril distribution. Suitable devices for this kind of action includes homogenizers such as GEA Ariete and rotor-rotor grinders, such as Atrex. When using a homogenizer the pressure should not exceed 1200 bars, preferably 600 bars in order to avoid nanofibrillation of the cellulose fibers. The nanofibrillation refers to a process wherein at least one dimension of the cellulose material is diminished to below 100 nm scale, i.e. the often noticed surface fibrillation of cellulose fibers during the refining is not considered to be nanofibrillation described in this present disclosure.

In an embodiment the cellulose pith is fibrillated to comprise a mixture of nanofibrillar cellulose and cellulose fibers. Preferably fibrillation is carried out to obtain fibrils having: i. nanofibrillar cellulose with a number average diameter 2-500 nm, preferably 5-200 nm and ii. cellulose fibers with a diameter 5-40 micrometers and length above 200 micrometers.

Aqueous suspensions can be effectively fibrillated at a concentration range of 0.05 wt. %-50 wt. %. Typically, chemically unmodified cellulose fibers requires very high-shear fibrillation to form nanocellulose, for example six to twelve passes through a fluidisizer at 1800 bar at 1.0% wood cellulose suspensions is required to nanofibrillate such native cellulose fiber. For the present invention, the fibrillation method utilizes techniques that lie within a specific window that allows for the selective fibrillation of only the parenchymal cellulose structures and not the secondary cell walls in cellulose fibers. For example, when carrying out the fibrillation for a base treated 1.0% suspension through a homogenizer at 600 bar four times will nanofibrillate the parenchymal cellulose structures into nanocellulose, without fibrillating cellulose fibers. Similarly, running a base extracted 3.6% suspension through a rotor-rotor (Atrex, 1800 rpm) gringer will selectively nanofibrillate the parenchymal cellulose structures. Cellulose fibres with a thick secondary cell wall structure, on the other hand, will not nanofibrillate under these conditions. Hence, the utilizing either of the aforementioned fibrillation techniques on base-extracted spent bagasse pith selectively fibrillates only the parenchymal cellulose, leading to a bimodal fibril distribution.

In the process the nanofibrillar cellulose and cellulose fibres can both be obtained from spent bagasse pith. Alternatively, a pith rich fraction obtained from bagasse can be used. Due to the native cellulose microfibril structure found in parenchymal primary cell walls, the extraction and processing of said cellulose microfibrils requires considerably less energy than the cellulose fibers extracted from wood cells or from non-depithed bagasse.

After fibrillation the composition has improved rheological properties and the resulting gel, partially or fully, comprising the nanofibrillated cellulose in an aqueous medium has improved storage modulus and yield-stress. Also, the properties of a film produced from the resulting gel or suspension by removing water are improved compared to a film from non-fibrillated material. In particular, such film has improved tensile strength compared to a film produced accordingly from non-fibrillated cellulose.

The present composition can be provided in a wet, semi dry or dry form.

The present composition may be used to modify one or more of the viscosity, suspension stability, gel insensitivity to temperature, shear reversible gelation, yield stress, and liquid retention of the composition of matter. Compositions whose rheological properties may be modified in this manner include foods, feeds, pharmaceuticals, nutraceuticals, personal care products, fibres, papers, paints, coatings, and construction compositions. More specifically, possible compositions include oral care products; creams or lotions for epidermal application, including moisturizing, night, anti-age, or sunscreen creams or lotions; food spreads, including reduced fat, low fat, or fat free food spreads (for example, mayonnaise); and drilling fluids.

Alternatively, the present composition may be incorporated into a coating composition in order to improve its physical and/or mechanical properties. Those properties may include one or more of film forming, levelling, sag resistance, strength, durability, dispersion, flooding, floating, and spatter. The present composition may be added as a gel, film, or powder.

The present composition may further be used in the manufacture of paper and board or paper and board products in order to improve at least one of sizing, strength, scale control, drainage, dewatering, retention, clarification, formation, absorbency, film formation, membrane formation, and polyelectrolyte complexation during manufacture. Fibrillated composition is particularly preferred for use in this method.

In one embodiment of this method, the present composition may be used to increase the rate of drainage and/or dewatering during paper manufacture. In another embodiment, the present cellulose may be used for retention of organic and/or inorganic dispersed particles in a sheet of paper during its manufacture. Representative dispersed particles which may be retained in this manner include pulp fines, fillers, sizing agents, pigments, clays, detrimental organic particulate materials, detrimental inorganic particulate materials, and combinations thereof. Additionally, the present composition may be used in a papermaking machine to improve the strength of a sheet of paper or board produced on a paper or board machine. Fibrillated composition according to the present disclosure is particularly preferred for use in this method.

In each of the embodiments described above, the composition may be used in the presence of one or more of the following: colloidal silica; colloidal aluminium modified silica; colloidal clay, derivatives of starch; derivatives of guar gum; natural gums or derivatized natural gums; polyacrylamides; and combinations thereof. Fibrillated composition according to the invention is particularly preferred for use in this method.

The present composition may further be used in a method for improving the stability of an emulsion, dispersion, or foam system, by including the composition in the system. Where the system being treated is an emulsion, the emulsion may be produced by processing of an emulsion formulation, in which case the composition may be added to the emulsion formulation prior to completion of processing of the emulsion formulation. Fibrillated composition according to the present disclosure is particularly preferred for use in this method.

In an embodiment the present composition has a yield stress of between 40 and 140 MPa, more preferably from 80 to 120 MPa.

In an embodiment the composition has a property of being capable of forming a film, which has a tensile strength higher than before fibrillation. The film, or the article of manufacture may be formed from an aqueous suspension of the composition by removing water.

In an example embodiment the composition has a property of being capable of forming a gel having an elastic modulus higher than before fibrillation. The gel may be formed by suspending the present composition in water.

In an embodiment in the process for producing the present composition the alkali treatment is carried out basic aqueous environment at 20-90 degrees optionally with an alkali selected from NaOH and KOH.

In an embodiment in the process the cellulose gel obtained in the process is and/or concentrated after its production.

The foregoing description has provided, by way of non-limiting examples of particular implementations and embodiments of the invention, a full and informative description of the best mode presently contemplated by the inventors for carrying out the invention. It is however clear to a person skilled in the art that the invention is not restricted to details of the embodiments presented in the foregoing, but that it can be implemented in other embodiments using equivalent means or in different combinations of embodiments without deviating from the characteristics of the present disclosure.

Furthermore, some of the features of the afore-disclosed embodiments of this present disclosure may be used to advantage without the corresponding use of other features. As such, the foregoing description shall be considered as merely illustrative of the principles of the present invention, and not in limitation thereof. Hence, the scope of the aspects of the disclosed embodiments is only restricted by the appended patent claims.

EXAMPLES

Example 0

Extraction of Bagasse Pith

The pith part of bagasse, from which the water and soluble components had been previously removed, was separated into two fractions. Here, the soft inner core, i.e. the pith, was mechanically scraped off the hard outer shell. The solids content of the extracted pith fraction was 90 wt. %.

Example 1

Separation of Parenchymal Cells from Cellulose Fibres

Dried extracted pith (see Example 0) contained two distinctly different structures bound together in their natural state: (i) soft foam consisting of parenchymal cell matrix (A) with (ii) cellulose fibres (B) running parallel to each other. These two structures were separated and their relative weight ration determined. First, 9.36 g of dried bagasse pith was ground using a Waring blender. Parenchymal cell structure was removed by grinding the resulting mixture through a stainless steel mesh (pore size 0.5 mm) resulting in two phases: a fine powder consisting of parenchymal cell structure (6.7 g) and predominantly cellulose fibres (2.5 g). The relative mass ration was A/B=2.7/1, assuming that the other components of the pith are distributed evenly to the fractions.

Example 2

Base Extraction of Bagasse Pith at 0.3M Alkali

Never-dried bagasse pith was extracted in a hot lye wash. Here, the bagasse pith (solids 90 g) was taken to a 2 g/L suspension, with 0.3 M NaOH and heated to 80° C. Thereafter, the base extraction was stirred for 120 minutes. After 120 minutes of stirring, the reaction was cooled down and filtrated through a stainless steel mesh (0.25 mm pore size). The extracted pulp was washed with copious amounts of water. The final yield, after washing with water, was 43%.

The rheological properties could be further promoted by high-pressure homogenization (see Example 5, Tables 2 & 3) (Sample 107). The resulting fibrillated parenchymal cellulose was characterized using turbidity and viscosity measurements, characteristic values are summarized in Table 1.

Example 3

Base Extraction of Bagasse Pith at 0.76M Alkali

Never-dried bagasse pith was extracted in a hot lye wash. Here, the bagasse pith (solids 90 g) was taken to a 2 g/L suspension, with 0.76 M NaOH and heated to 80° C. Thereafter, the base extraction was stirred for 120 minutes. After 120 minutes of stirring, the reaction was cooled down and filtrated through a stainless steel mesh (0.25 mm pore size). The extracted sample was washed with copious amounts of water. The final yield, after washing with water, was 38%. The parenchyma cells and cellulose fibers can be easily separated from the raw material by gentle mixing with a Waring-blender (10 s, 2% suspension), see Image A in FIG. 1.

The rheological properties could be further promoted by high-pressure homogenization (see Example 5, Tables 2 & 3) (Sample 108). The resulting fibrillated parenchymal cellulose was characterized using turbidity and viscosity measurements, characteristic values are summarized in Table 1.

The rheological properties could be alternatively promoted by running the base extracted sample through a rotor-mixer at 1800 rpm either two times (Sample 121-2 pass) or four times (Sample 121-4 pass) (see Example 6, Tables 2 & 3). The resulting fibrillated parenchymal cellulose samples were characterized using turbidity and viscosity measurements, characteristic values are summarized in Table 1.

Example 4

Bleaching of Base Extracted Bagasse Pith

Base extracted bagasse pith pulp; base extracted at 0.3 M, was taken to a 2% suspension and a solution of 13% NaClO was added over 60 minutes while keeping the pH at a level 7.5. After 120 minutes stirring at 21° C., the bleached pulp was washed with copious amounts of water. The bleached bagasse pith pulp can be optionally nanofibrillated.

The rheological properties could be further promoted by running it through a rotor-mixer at 1800 rpm (see Example 6).

Example 5

High-pressure Homogenization of Base-extracted Bagasse Pith

The rheological properties could be further promoted by high-pressure homogenization of the extracted, optionally bleached, bagasse pith pulp. By running base extracted bagasse pulp suspension or bleached bagasse pith pulp suspension (5, 10 & 25 g/L) through a homogenizer at 600 bar between 1 to 4 times, the rheological properties were promoted.

Example 6

Fibrillation of Base-extracted Bagasse Pith Using a Rotor-mixer

The rheological properties could be further promoted by nanofibrillation of the extracted, optionally bleached, bagasse pith pulp. By running base extracted bagasse pulp suspension or bleached bagasse pith pulp suspension through a rotormixer at 1800 rpm between 1 to 4 times, the rheological properties were promoted.

Example 7

Mechanical Characterization of Solvent Cast Films Sample Preparation

Materials were solvent cast as follows. Samples were diluted to a solid content suitable for solvent casting, typically 0.4-5.0 wt. %, and degassed in vacuum to remove bubbles formed due to mixing. For example, an amount containing 100 mg of solids was applied onto a plastic petri dish (diameter 50 mm). The samples were dried in an oven at 60° C. until they appeared dry. The films were removed from the petri dishes, and the drying was continued for at least 4 h between blotting papers at a temperature above 100° C.

The solvent-cast films were cut to 2 mm wide strips for mechanical testing. The thickness of each strip was measured using a Mitutoyo film thickness gauge. Thicknesses were measured at three points, and the average was used for data analysis. Before tensile testing, the samples were stored at a controlled humidity (RH 50%, 20° C.) overnight. Tensile tests were performed using a Kammrath & Weiss tensile tester with a 100 N load cell. The grip separation in the starting position was 10 mm. Sample strips were elongated at 1.00 mm/min, and the force and elongation were measured at a sampling frequency of 20 Hz. From each film, 5-6 strips were measured.

Tensile strength, elastic modulus, strain (elongation) at break, and the modulus of toughness (i.e., the area under the stress-strain curve) were determined separately from each single measurement. The mean values for each property are tabulated together with standard error of mean. An average curve was generated by calculating the average of stresses at each strain point until the average strain at break, linearly interpolating the measured data for each point. Before calculating the average curve, the data from the samples that broke before average were linearly extrapolated until the average strain at break.

The tensile testing results are shown in Table 1 for Sample 121-4 pass.

TABLE 1

Mechanical properties with the standard error.

| Sample/pass through rotor mixer (1800 rpm) | Tensile strength (MPa) | Elastic modulus (GPa) | Strain at break (%) | Modulus of toughness (MJ/m$^3$) |
|---|---|---|---|---|
| Sample 121 - 4 pass | 96.1 ± 2.0 | 4.2 ± 0.1 | 7.3 ± 0.3 | 2.0 ± 0.1 |

Example 8

Characterization Methods: Rheology and Turbidity

The viscosity of the sample was measured by Brookfield DV3T viscosimeter (Brookfield Engineering Laboratories, Middleboro, USA) equipped with a vane geometry (V-72, diameter 21.67 mm, length 43.38 mm). The product was diluted with water to 1.0% w/w and the sample was agitated for 10 min before the measurement followed by degassing in vacuum to remove the entrapped air bubbles in the sample. The temperature was adjusted to 20° C. prior to measurements. The viscosity of the samples was measured at 50 and 100 rpm shear rates.

Turbidity of dilute aqueous suspensions was measured with HACH P2100 turbidimeter. The product was diluted with water to a concentration of 0.1 wt %, and the sample was agitated for 10 min before the measurement followed by degassing in vacuum to remove the entrapped air bubbles in the sample. The temperature was adjusted to 20° C. prior to the measurement where the emission of light scattered from particles of a sample was detected.

TABLE 2

Summary of the turbidity, viscosity results and mean nanofibril diameters (excluding the cellulose fibres).

| Sample | Turbidity (NTU) | Viscosity 50 rpm (Pa s) | Viscosity 100 rpm (Pa s) | Diameter of nanofibrillar parenchymal cellulose (nm) |
|---|---|---|---|---|
| 107 | 387 ± 11 | 1087 | 731 | 67 ± 28 |
| 108 | 365 ± 12 | 1102 | 758 | 54 ± 20 |
| 121-2 pass | 336 ± 11 | 1152 | 784 | 59 ± 23 |
| 121-4 pass | 328 ± 12 | 1472 | 921 | 47 ± 17 |

TABLE 3

Summary of the raw material information and fibrillation methods.

| Sample | Raw material | Fibrillation method/ Fibrillation concentration |
|---|---|---|
| 107 | Never dried bagasse pith | Example 5, 4 pass at 600 bar, 1 wt. % |
| 108 | Never dried bagasse pith | Example 5, 4 pass at 600 bar, 1 wt. % |
| 121-2 pass | Never dried bagasse pith | Example 6, 2 pass at 1800 rpm, 3.6% |
| 121-4 pass | Never dried bagasse pith | Example 6, 2 pass at 1800 rpm, 3.6% |

Example 9

Optical Microscopy Characterization of Bagasse Pith

The samples were evaluated with Nikon optical microscope Model E200 at concentrations 1-4% using 4-40× magnification without any staining.

Optical microscopy images of parenchymal material from bagasse pith (FIG X) (Example 3). A: hydrated raw material without any treatments, B: base extracted (0.76 M NaOH) bagasse after mixing with Waring blender, note the parenchymal cells and cellulose fibres; C: the sample B after homogenization (4 pass at 600 bar), note that only the cellulose fibres are visible as the parenchymal nanocellulose can not be visualized using optical microscopy. Scale bar 100 micrometers, magnification 10× with polarizers.

To determine the mean amount of cellulose fibres, Sample 121-4 pass was diluted to 0.05 wt. %. By placing a small drop (droplet mass between 7-11 mg) of the aforementioned diluted suspension on an optical microscopy slide and the water was allowed to evaporate. Thereafter, the number of visible cellulose fibres were counted and the results tabulated (Table 4). The droplet was deposited on a standard counting grid (3*3 mm) (FIG. 2). Eight parallel samples were evaluated.

TABLE 4

Tabulated results of the mean amount of cellulose fibres in Sample 121 - 4 pass. The studied fibrillated bagasse suspension had a solids content of 0.05 wt. %. The results were then nominalized to 1 mL suspension with a solids content of 0.05 wt. %. The average amount of cellulose fibres using this method is 5384 within 1 mL of a 0.05 wt. % suspension of Sample 121 - 4 pass.

| Sample | 0.05 wt. % suspension (mg) | No. fibres | No. fibres/1 mL of 0.05 wt. % suspension |
|---|---|---|---|
| 1 | 9.5 | 49 | 5158 |
| 2 | 7.8 | 34 | 4359 |
| 3 | 9.8 | 50 | 5102 |
| 4 | 9.3 | 49 | 5269 |
| 5 | 8.1 | 46 | 5679 |
| 6 | 9.6 | 58 | 6042 |
| 7 | 10.9 | 66 | 6055 |
| 8 | 8.5 | 46 | 5412 |

Example 10

Wet Fractionation of Base Extracted Bagasse Pith

Sample 121-4 pass was wet-fractioned by diluting the sample to 0.05 wt. % and running the suspension through meshes. The resulting fractions were collected using stainless meshes with pore sizes, in the order of filtration, 800*800 um (Mesh 1), 400*250 um (Mesh 2), 300*300 um (Mesh 3) & 50*50 um (Mesh 4). Using this method, for said suspension, collected fractions, calculated using the fractionated pulps' solid content, were: Mesh 1: 3.5%; Mesh 2: 43.2%; Mesh 3: 5.9%; & Mesh 4 15.7%.

Using the aforementioned method for a 0.025 wt. % suspension (Sample 121-4 pass), the relative fractions were: Mesh 1: 3.1%; Mesh 2: 43.2%; Mesh 3: 5.9%; & Mesh 4: 15.7%.

Example 11

Characterization Using Scanning Electron Microscopy

Sample 121-4 pass was first diluted to 0.1 wt. %. The sample was stirred over night and then sonicated for 10 minutes. After sonication, a drop of diluted sample was deposited onto a silicone wafer and subsequently dried at 80° C. Dry samples were then imaged using a Zeiss FE-SEM at 0.1 kV (FIGS. 3, 4 & 5).

Example 11

Characterization Using Transmission Electron Microscopy

Sample 121-4 pass was prepared by depositing 3 uL onto a Formvar grid (30 s=$O_2/H_2$ plasma). This grid was washed 3 times with water by depositing small drops of water and removing them with filter paper. The sample was shadow coated with 2 nm of platinum and imaged using a FEI Tecnai 12, bright field, 120 kV (FIG. 6).

Using the images, mean nanofibril diameters, excluding the cellulose fibres, were calculated and tabulated (Table 2).

The invention claimed is:

1. A process for preparing a composition comprising:
   A nanofibrillar parenchymal cellulose; and
   B cellulose fibers;
   wherein both A and B are obtained from cellulose pith, the process comprising:
   a. providing or isolating cellulose pith from cellulose pith material;
   b. treating the cellulose pith with an alkali; and
   c. fibrillating the alkali treated cellulose pith.

2. The process of claim 1 comprising a fractionating step between steps a. and b., or between the steps b. and c., to recover a parenchymal cell rich fraction or to alter the relative fraction of parenchymal cells and cellulose fibers.

3. The process of claim 2 wherein the fractionating step is by dry fractioning or wet fractioning.

4. The process of claim 1 comprising a fractionating step after step c to recover the nanofibrillar parenchymal cell rich fraction or to alter the relative fraction of A and B fractions.

5. The process of claim 1 wherein the alkali treatment in step b. comprises washing the alkali treated cellulose pith and removing the filtrate.

6. The process of claim 1 wherein a chemical derivatization is carried before, after or during the step b, the chemical derivatization including cationization, oxidation, bleaching, acetylation, esterification, etherification reactions, or a combination thereof.

7. The process of claim 2 comprising a fractionating step after step c to recover the nanofibrillar parenchymal cell rich fraction or to alter the relative fraction of A and B fractions.

8. The process of claim 3 comprising a fractionating step after step c to recover the nanofibrillar parenchymal cell rich fraction or to alter the relative fraction of A and B fractions.

9. The process of claim 2 wherein the alkali treatment in step b. comprises washing the alkali treated cellulose pith and removing the filtrate.

10. The process of claim 3 wherein the alkali treatment in step b. comprises washing the alkali treated cellulose pith and removing the filtrate.

11. The process of claim 4 wherein the alkali treatment in step b. comprises washing the alkali treated cellulose pith and removing the filtrate.

12. The process of claim 2 wherein a chemical derivatization is carried before, after or during the step b, the chemical derivatization including cationization, oxidation, bleaching, acetylation, esterification, etherification reactions, or a combination thereof.

13. The process of claim 3 wherein a chemical derivatization is carried before, after or during the step b, the chemical derivatization including cationization, oxidation, bleaching, acetylation, esterification, etherification reactions, or a combination thereof.

14. The process of claim 4 wherein a chemical derivatization is carried before, after or during the step b, the chemical derivatization including cationization, oxidation, bleaching, acetylation, esterification, etherification reactions, or a combination thereof.

15. The process of claim 5 wherein a chemical derivatization is carried before, after or during the step b, the chemical derivatization including cationization, oxidation, bleaching, acetylation, esterification, etherification reactions, or a combination thereof.

* * * * *